United States Patent
Knipe

(10) Patent No.: US 6,906,850 B2
(45) Date of Patent: Jun. 14, 2005

(54) CAPACITIVELY COUPLED MICROMIRROR

(75) Inventor: Richard L. Knipe, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/027,873

(22) Filed: Dec. 21, 2001

(65) Prior Publication Data

US 2002/0122238 A1 Sep. 5, 2002

Related U.S. Application Data

(60) Provisional application No. 60/258,609, filed on Dec. 28, 2000.

(51) Int. Cl.[7] .................. G02B 26/00; G02B 26/08; G09G 3/34
(52) U.S. Cl. ................. 359/295; 359/224; 345/85
(58) Field of Search ............... 359/223, 224, 359/290–292, 298, 295; 345/30, 55, 84, 85

(56) References Cited

U.S. PATENT DOCUMENTS

| | | | |
|---|---|---|---|
| 5,061,049 A | | 10/1991 | Hornbeck .................... 359/291 |
| 5,285,407 A | * | 2/1994 | Gale et al. ............. 365/189.11 |
| 5,444,566 A | * | 8/1995 | Gale et al. .................. 359/291 |
| 5,583,688 A | | 12/1996 | Hornbeck .................... 359/291 |
| 5,953,103 A | * | 9/1999 | Nakamura .................... 355/32 |
| 6,147,790 A | | 11/2000 | Meier et al. ................. 359/224 |
| 6,356,378 B1 | * | 3/2002 | Huibers ....................... 359/291 |
| 6,473,361 B1 | * | 10/2002 | Chen et al. .................. 365/244 |
| 6,480,433 B2 | * | 11/2002 | Huffman ..................... 365/201 |
| 6,525,864 B1 | * | 2/2003 | Gee et al. .................... 359/291 |

* cited by examiner

*Primary Examiner*—Georgia Epps
*Assistant Examiner*—William Choi
(74) *Attorney, Agent, or Firm*—Charles A. Brill; Wade James Brady, III; Frederick J. Telecky, Jr.

(57) ABSTRACT

A capacitively coupled microelectromechanical device comprising: a semiconductor substrate; a member operable to deflect to either of at least two states; and a switch for selectively connecting the member to a voltage signal. When a logic high signal is stored on memory capacitor, mirror transistor is turned on, grounding the mirror structure. When a logic low signal is stored on the memory capacitor, the mirror transistor is turned off, allowing the mirror to float electrically. Mirrors that are tied to a voltage potential, which typically are grounded, are affected by a reset pulse and rotate away from their landed position. When the mirrors have rotated to the opposite side, a bias signal is applied to hold the repositioned mirror in place in the opposite state. Mirrors that electrically are floating do not experience the forces generated by the reset voltage and remain in their previous state.

28 Claims, 4 Drawing Sheets

CAPACITIVELY COUPLED MICROMIRROR

This application claims priority under 35 USC §119(e)(1) of provisional application No. 60/258,609 filed Dec. 28, 2000.

CROSS-REFERENCE TO RELATED APPLICATIONS

The following patents and/or commonly assigned patent applications are hereby incorporated herein by reference:

| Patent No. | Filing Date | Issue Date | Title |
| --- | --- | --- | --- |
| 5,061,049 | Sep. 13, 1990 | Oct. 29, 1991 | Spatial Light Modulator and Method |
| 5,583,688 | Dec. 21, 1993 | Dec. 10, 1996 | Multi-Level Digital Micromirror Device |
| 6,147,790 | May 13, 1999 | Nov. 14, 2000 | Spring Ring Micromechanical Device |

FIELD OF THE INVENTION

This invention relates to the field of microelectromechanical systems, more particularly to micromirror arrays.

BACKGROUND OF THE INVENTION

Micromechanical devices are small structures typically fabricated on a semiconductor wafer using techniques such as optical lithography, doping, metal sputtering, oxide deposition, and plasma etching which have been developed for the fabrication of integrated circuits.

Micromirror devices are a type of micromechanical device. Other types of micromechanical devices include accelerometers, pressure and flow sensors, gears and motors. While some micromechanical devices, such as pressure sensors, flow sensors, and micromirrors have found commercial success, other types have not yet been commercially viable.

Digital micromirror devices are primarily used in optical display systems. In display systems, the micromirror is a light modulator that uses digital image data to modulate a beam of light by selectively reflecting portions of the beam of light to a display screen. While analog modes of operation are possible, micromirrors typically operate in a digital bistable mode of operation and as such are the core of the first true digital full-color image projection systems.

Micromirrors have evolved rapidly over the past ten to fifteen years. Early devices used a deformable reflective membrane which, when electrostatically attracted to an underlying address electrode, dimpled toward the address electrode. Schlieren optics illuminate the membrane and create an image from the light scattered by the dimpled portions of the membrane. Schlieren systems enabled the membrane devices to form images, but the images formed were very dim and had low contrast ratios, making them unsuitable for most image display applications.

Later micromirror devices used flaps or diving board-shaped cantilever beams of silicon or aluminum, coupled with dark-field optics to create images having improved contrast ratios. Flap and cantilever beam devices typically used a single metal layer to form the top reflective layer of the device. This single metal layer tended to deform over a large region, however, which scattered light impinging on the deformed portion. Torsion beam devices use a thin metal layer to form a torsion beam, which is referred to as a hinge, and a thicker metal layer to form a rigid member, or beam, typically having a mirror-like surface: concentrating the deformation on a relatively small portion of the micromirror surface. The rigid mirror remains flat while the hinges deform, minimizing the amount of light scattered by the device and improving the contrast ratio of the device.

Recent micromirror configurations, called hidden-hinge designs, further improve the image contrast ratio by fabricating the mirror on a pedestal above the torsion beams. The elevated mirror covers the torsion beams, torsion beam supports, and a rigid yoke connecting the torsion beams and mirror support, further improving the contrast ratio of images produced by the device. Additional contrast improvements have been provided by various coatings applied to the substrate of other areas underneath the mirrors.

Yet another recent micromirror configuration, called a spring-ring design, provide an intermediate resilient member to land the micromirror on. The resilient member is deformed when the mirror lands and stores this potential energy until the electrostatic force deflecting the mirror is removed. When the mirror is released, the resilient member springs the mirror back toward its neutral position.

All previous torsion beam micromirror designs have used a memory cell to create an electric field between the mirror and an address electrode on each side of the torsion hinge. The voltage differential between the mirror and one of the address electrodes is greater than between the mirror and the other address electrode—causing a greater electrostatic attraction to occur on the side having the greatest voltage differential. This unbalanced attractive force deflects the mirror to the side having the greatest attractive force.

Using the memory cell to generate a voltage has an undesired side effect on the design of the micromirror circuitry. The difference between the two address electrodes must fairly substantial to enable reliable control of the mirror position. Advances in CMOS semiconductor processes, however, are intended to reduce the feature size of the circuitry and reduce the power consumption of the circuitry. Both of these advances tend to result in lower voltage operation of the CMOS circuitry. Thus, it is becoming increasingly difficult to use standard modern CMOS processes to fabricate a memory cell that will reliably drive the address voltages of a micromirror device at a level sufficient to control the mirror position.

What is needed is a method and system for positioning the micromirror that provides reliable mirror positioning along with an excellent lifetime reliability, yet is able to be manufactured using both the fabrication processes in use today as well as advanced fabrication techniques likely to be developed in the immediate future.

SUMMARY OF THE INVENTION

Objects and advantages will be obvious, and will in part appear hereinafter and will be accomplished by the present invention which provides a method and system for a capacitively controlled micromirror and system. One embodiment of the disclosed invention provides a micromechanical device. The micromechanical device comprises: a semiconductor substrate; a member operable to deflect about a torsion axis to either of at least two states; and a switch driven for selectively connecting the member to a voltage signal.

According to another embodiment of the disclosed invention provides a method of operating a micromechanical device, the method comprising: selectively grounding a deflectable member; and applying a reset signal to bias electrodes to reposition the selectively grounded deflectable member.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

A new micromirror design and method of operation has been developed. The method operates a bistable deflectable member as a state machine. The data written to each element of the micromirror array does not determine which of the two bistable positions the mirror is to achieve, but instead whether the mirror will change states or not. The method and system are applicable to any micromechanical devices that use capacitive coupling to influence mechanical coupling for the purpose of state transition.

Figure 1:
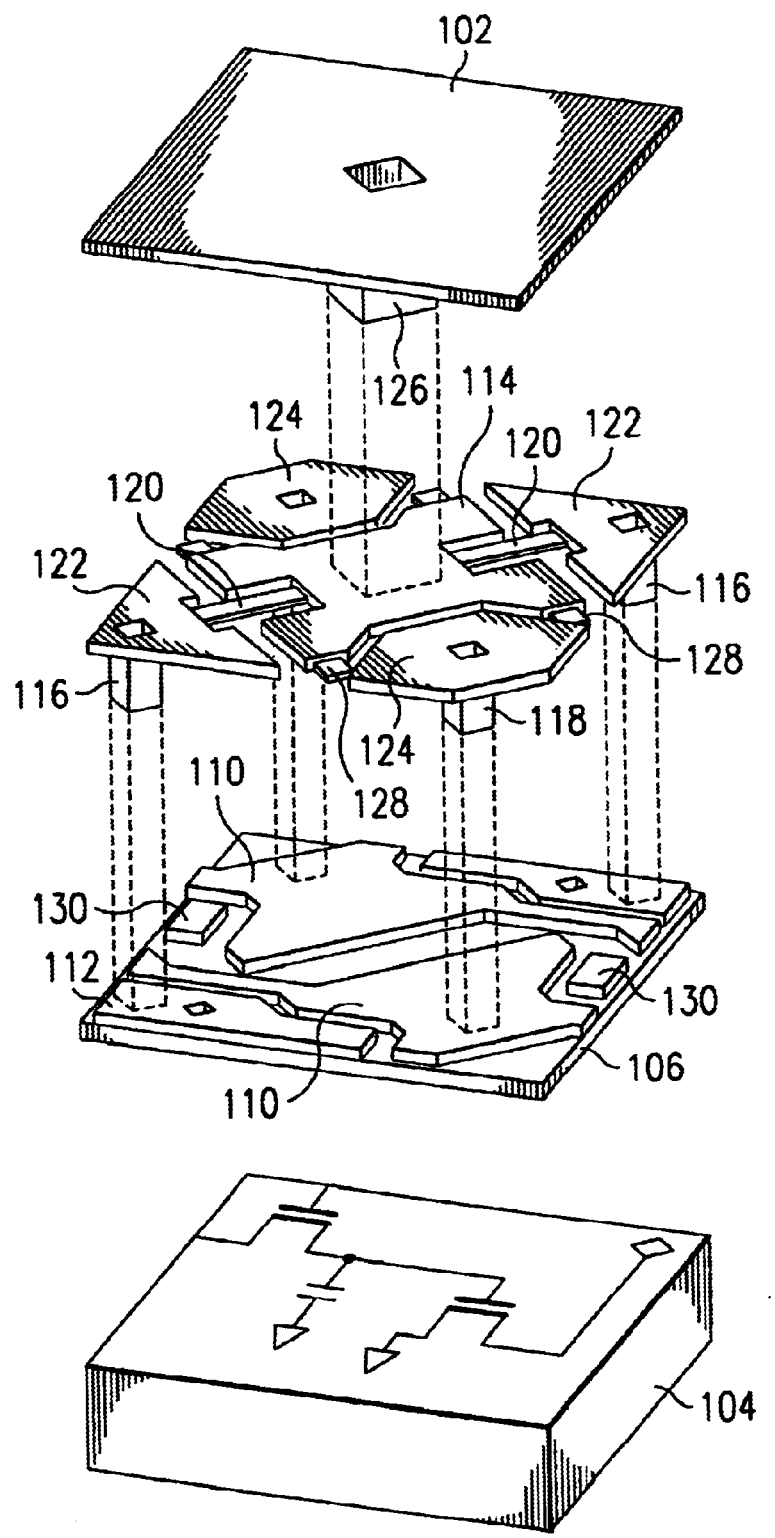
FIG. 1 is an exploded perspective view of a single spring-tip micromirror element showing the various structures of the micromirror and the underlying circuitry according to one embodiment of the present invention.

FIG. 1 is an exploded view of a single micromirror element of the present invention detailing the relationships between the micromirror structures. The micromirror is fabricated on a semiconductor, typically silicon, substrate 104. Electrical control circuitry is typically fabricated in or on the surface of the semiconductor substrate 104 using standard integrated circuit process flows. This circuitry typically includes, but is not limited to, a memory cell associated with, and typically underlying, each mirror 102 and digital logic circuits to control the transfer of the digital image data to the underlying memory cells. Voltage driver circuits to drive bias and reset signals to the mirror superstructure may also be fabricated on the micromirror substrate, or may be external to the micromirror. Image processing and formatting logic is also formed in the substrate 104 of some designs. For the purposes of this disclosure, addressing circuitry is considered to include any circuitry, including direct voltage connections and shared memory cells, used to control the direction of rotation of a micromirror.

Some micromirror configurations use a split reset configuration which allows several micromirror elements to share one memory cell- thus reducing the number of memory cells necessary to operate a very large array, and making more room available for voltage driver and image processing circuitry on the micromirror integrated circuit. Split reset is enabled by the bistable operation of a micromirror, which allows the contents of the underlying memory to change without affecting the position of the mirror 102 when the mirror has a bias voltage applied.

The silicon substrate 104 and any necessary metal interconnection layers are isolated from the micromirror superstructure by an insulating layer 106 which is typically a deposited silicon dioxide layer on which the micromirror superstructure is formed. Holes, or vias, are opened in the oxide layer to allow electrical connection of the micromirror superstructure with the electronic circuitry formed in the substrate 104.

The first layer of the superstructure is a metalization layer, typically the third metalization layer and therefore often called M3. The first two metalization layers are typically required to interconnect the circuitry fabricated on the substrate. The third metalization layer is deposited on the insulating layer 106 and patterned to form bias electrodes 110 and mirror support pads 112. Micromirrors typically have some sort of limiting mechanism to limit the rotation of the mirror 102 and prevent the rotated mirror 102 or hinge yoke 114 from touching the bias electrodes 110, which have a voltage potential relative to the mirror 102. If the mirror 102 contacts the bias electrodes 110, the resulting short circuit could fuse the torsion hinges 116 or weld the mirror 102 to the bias electrodes 110, in either case ruining the micromirror.

The micromirror shown in FIG. 1 is a spring-tip design. Resilient spring-tip 128 extensions of the hinge yoke 114 contacts areas of the mirror support pads 112 and additional landing sites 130 to stop the rotation of the hinge yoke 114 and mirror 102.

Figure 2:
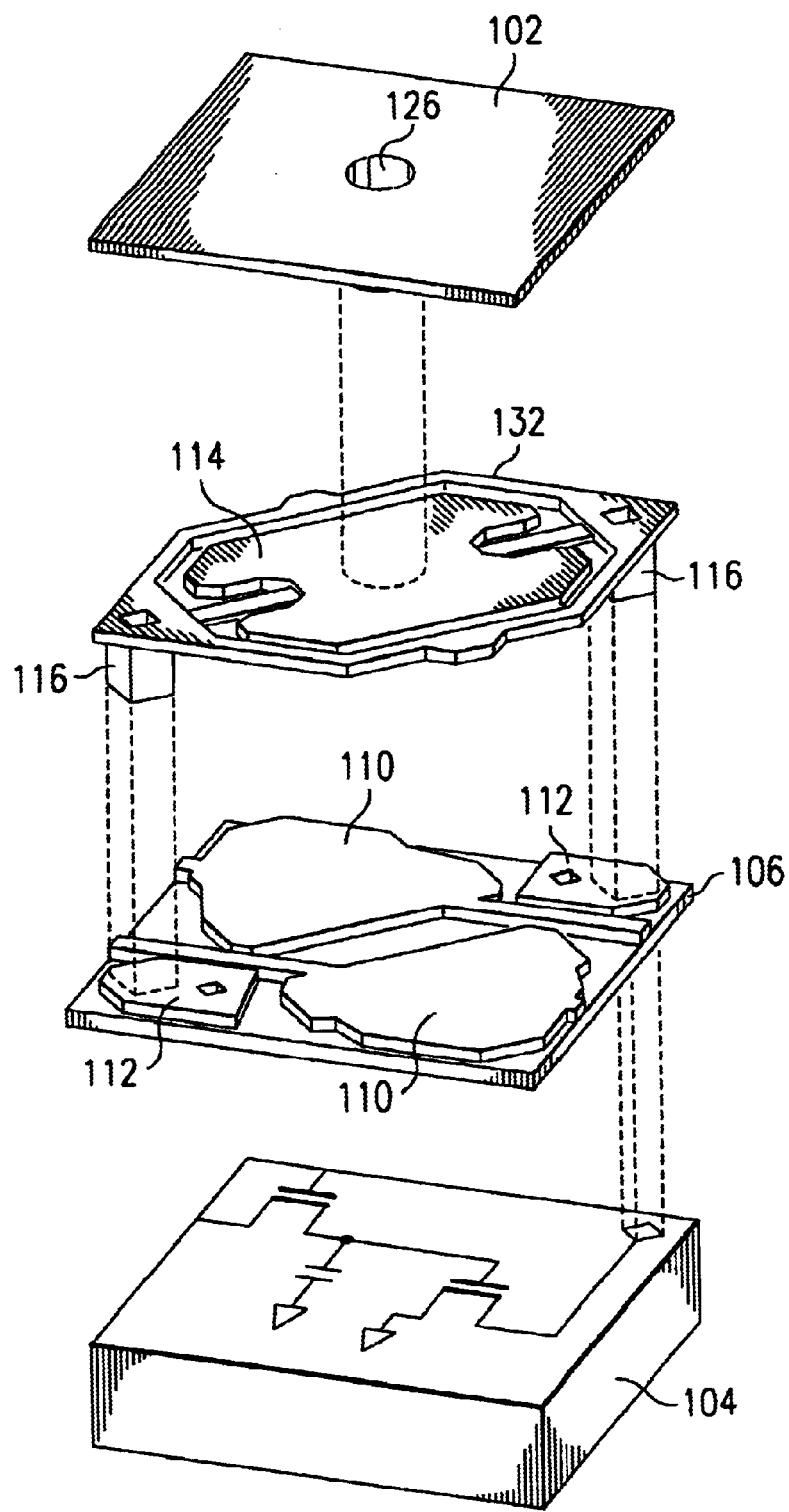
FIG. 2 is an exploded perspective view of a single spring-ring micromirror element showing the various structures of the micromirror and the underlying circuitry according to one embodiment of the present invention.

The micromirror shown in FIG. 2 is a spring-ring design. A resilient ring member 132 extends around the device under the perimeter of the mirror. When the mirror 102 is deflected, the ring 132 contacts the underneath side of the mirror 102 and stops the rotation of the mirror. These landing sites, whether part of the mirror support pads 112 or separate landing sites 130, are often coated with a material chosen to reduce the tendency of the mirror 102 and torsion hinge yoke 114 to stick to the landing site.

The fabrication of the micromirror will be discussed in reference to FIG. 1. A first layer of supports, typically called spacervias, is fabricated on the metal layer forming the bias electrodes 110 and mirror bias connections 112. These spacervias, which include both hinge support spacervias 116 and upper bias electrode spacervias 118, are typically formed by spinning a thin spacer layer over the bias electrodes 110 and mirror bias connections 112. This thin spacer layer is typically a 1 $\mu$m thick layer of positive photoresist. After the photoresist layer is deposited, it is exposed, patterned, and deep UV hardened to form holes in which the spacervias will be formed. This spacer layer and a thicker spacer layer used later in the fabrication process are often called sacrificial layers since they are used only as forms during the fabrication process and are removed from the device prior to device operation.

A thin layer of metal is sputtered onto the spacer layer and into the holes. An oxide is then deposited over the thin metal layer and patterned to form an etch mask over the regions that later will form hinges 120. A thicker layer of metal, typically an aluminum alloy, is sputtered over the thin layer and oxide etch masks. Another layer of oxide is deposited and patterned to define the hinge yoke 114, hinge cap 122, and the upper bias electrodes 124. After this second oxide layer is patterned, the two metals layers are etched simultaneously and the oxide etch stops removed to leave thick rigid hinge yokes 114, hinge caps 122, and upper bias electrodes 124, and thin flexible torsion beams 120.

A thick spacer layer is then deposited over the thick metal layer and patterned to define holes in which mirror support spacervias 126 will be formed. The thick spacer layer is typically a 2 µm thick layer of positive photoresist. A layer of mirror metal, typically an aluminum alloy, is sputtered on the surface of the thick spacer layer and into the holes in the thick spacer layer. This metal layer is then patterned to form the mirrors 102 and both spacer layers are removed using a plasma etch.

Once the two spacer layers have been removed, the mirror is free to rotate about the axis formed by the torsion hinge. Electrostatic attraction between a bias electrode 110 and a deflectable rigid member, which in effect form the two plates of an air gap capacitor, is used to rotate the mirror. Depending on the design of the micromirror device, the deflectable rigid member typically is the torsion beam yoke 114 and the beam or mirror 102 or a beam attached directly to the torsion hinges. For simplicity, when the following description describes electrostatic forces on and movements of the deflectable rigid member, there term mirror will be used. The upper bias electrodes 124 also electrostatically attract the deflectable rigid member.

Prior art micromirrors created an unbalanced electrostatic field between an address electrode on either side of the torsion hinge axis and the mirror. This caused the mirror to rotate toward the side having the greatest potential difference. For example, a logic high signal—typically 5 volts—is applied to one address electrode, a logic low signal—typically 0 volts—is applied to the other address electrode, and a relatively large negative voltage is applied to the mirror to cause the mirror to rotate toward the positively biased address electrode.

The present invention breaks this tradition by not using an address electrode voltage to determine which address electrode will rotate to. Instead, the present invention either floats the mirror or ties the mirror to a voltage potential. Mirrors that are tied to a voltage potential, which typically are grounded, are affected by a reset pulse and rotate away from their landed position. When the mirrors have rotated to the opposite side, a bias signal is applied to hold the repositioned mirror in place in the opposite state. Mirrors that electrically are floating do not experience the forces generated by the reset voltage and remain in their previous state.

Figure 3:
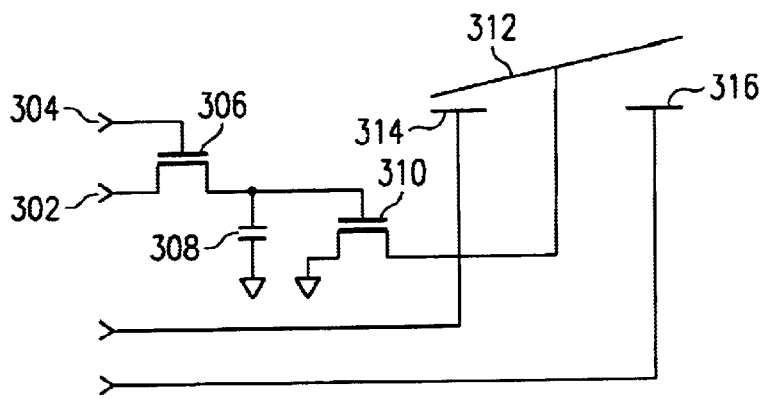
FIG. 3 is a schematic representation of one element of a micromirror array illustrating the circuitry driving a micromirror.

FIG. 3 is a schematic representation of one element of a micromirror array illustrating the circuitry driving a micromirror. In FIG. 3, data is written to the micromirror element through bit line 302. Word line 304 is active when the element is written to causing the switch, shown as pass transistor 306 to turn on and allowing the bit line driver to charge the memory capacitor 308. When a logic high signal is stored on the memory capacitor 308, the mirror transistor 310 is turned on grounding the mirror structure 312.

Figure 4:
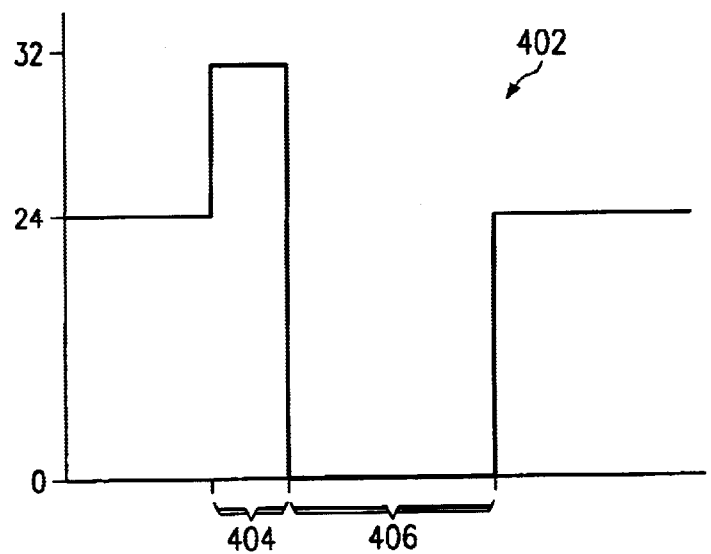
FIG. 4 is a plot of a reset waveform used to reposition deflectable micromechanical members of FIGS. 1 and 2.

When the mirror structure 312 is electrically grounded and positioned near bias electrode 314, a reset signal is applied to both of the bias electrodes 314, 316. A typical bias signal is shown in FIG. 4. In FIG. 4, the voltage level is shown on the Y axis while time is shown on the X axis. The bias signal 402 includes a reset pulse 404. The reset pulse 404 shown in FIG. 4 is a 32 volt pulse. The reset pulse 404 greatly increases the electrostatic attraction between the bias electrodes and the mirror. This causes the mirror to move toward the bias electrodes, which deforms the spring tips and may also deform the torsion hinge and hinge yoke. When the reset pulse is removed, the energy stored by the deformation is released and springs the mirror away from the bias electrode. The reset pulse duration is determined by the resonant response of the deflectable member and is chosen to maximize the release energy.

After the reset pulse 404, the bias voltage is removed for a short period 406 during which the released mirror transitions from a first bias electrode to near a bias electrode on the opposite side of the torsion hinge. After the mirror is repositioned near the opposite bias electrode, the bias signal is reapplied, holding the mirror against the opposite bias electrode. Typically a 24 volt bias signal is used to hold the mirror in position.

The forces created during the reset process are proportional to the square of the voltage differential between the bias electrode and the mirror. Since the mirror is grounded, the reset energy is proportional to the square of the reset voltage pulse.

Figure 5:
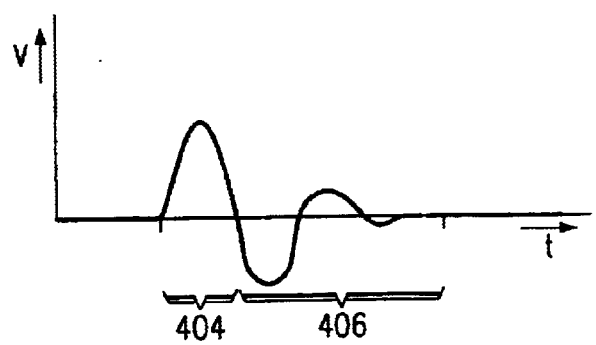
FIG. 5 is a plot of the voltage induced on the mirror during the reset pulse of FIG. 4.

Returning to FIG. 3, when it is desirable to keep a mirror in its current position, a logic low signal is applied to the bit line 302 when the word line 304 is active, writing a logic low onto the capacitor 308. The logic low signal does not turn on the mirror transistor 310 resulting in the mirror 312 being electrically isolated from the remainder of the circuit. FIG. 5 is a plot of the voltage induced on the mirror during the reset pulse 404 described above.

As described above, the force created by the pulse 404 is proportional to the square of the voltage differential between the bias electrode and the mirror. Since the mirror floats, the reset pulse may generate much less energy in a floating mirror compared to a grounded mirror. With less energy, the floating mirrors do not transition away from the nearby bias electrode until after the bias voltage is reapplied. Thus, floating mirrors are re-captured by the bias electrode while the grounded mirrors transition to the other state and are captured by the opposite bias electrode.

Since the data written to the memory only determines whether the mirror will change states, some mechanism is necessary to initially position the mirror in a known state. Putting the mirror in a know state is achieved by applying a bias voltage to only one of the two bias electrodes. This initialization function is the reason the two bias electrodes are electrically isolated from each other. An alternative is to use a separate initialization electrode, although an initialization electrode takes valuable area away from the bias electrodes.

Figures 6, 7:
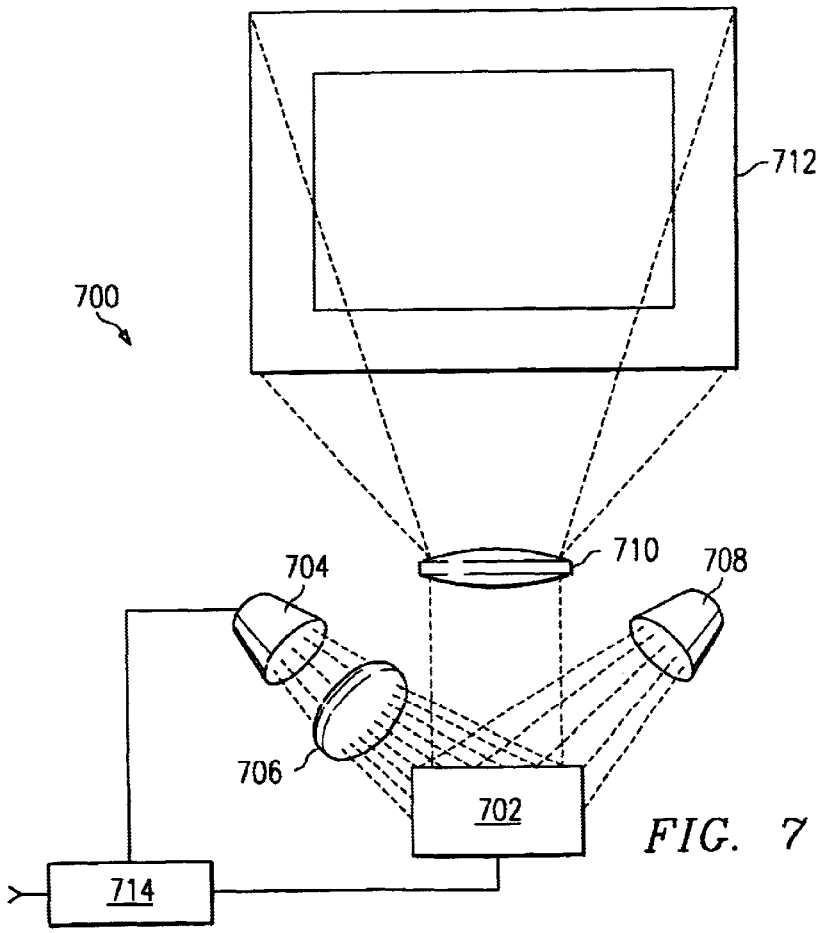
FIG. 6 is a schematic representation of a 4×4 array of micromechanical elements and their associated underlying memory arrays showing the operation of the deflectable members.
FIG. 7 is a schematic view of a micromirror-based projection system utilizing an improved micromirror device according to one embodiment of the present invention.

FIG. 6 is a schematic representation of a 4×4 portion of a mirror array and the associated portion of the underlying memory array showing the operation of the micromirror. In FIG. 6 each mirror in the mirror array initially is set to a first "off" position by the application of a bias voltage to only one of the bias electrodes ($V_1$=ON). This creates an unbalanced electrostatic attraction that forces the mirrors to the off position, shown as "O" in mirror array 602, regardless of the contents of the memory, shown as a don't care "X" in memory array 604.

To change the position of some of the mirrors, a logic "1" is written into the corresponding memory cell. The memory array 606, shown in FIG. 6, forces alternate mirrors to change state during a reset operation as shown in mirror array 608. Likewise writing memory array patterns 610 and 612 prior to the following reset operations results in the mirror positions shown in FIGS. 614 and 616. In the final representation of the mirror array 618, all of the mirrors are forced to the on position, regardless of the contents of the memory array 620 by the application of a bias voltage to only one of the bias electrodes ($V_2$=ON).

The new micromirror design and method of operation may provide several advantages. Since the memory voltage is not used to determine the position of a mirror, this design may enable the use of low voltage CMOS processes. Additionally, this design is less likely to suffer from mirror upset when the memory data is changed while the mirror is landed. The resistance of the device to photo-generated upset is increased since the photo-generated carriers do not alter the address voltages and are unlikely to be strong enough to change the state of the memory transistor. Because a single polarity reset voltage is used, the ESD protection may be added to protect the circuitry.

The new design typically reduces scrubbing of the landing sites by around 50% compared to prior architectures. Pixels that do not transition states remain on the landing sites and therefore do not scrub the landing site when they would otherwise release and re-land. Because the design relies on the reset velocity of the mirrors—and not hinge compliance—to transition the mirrors, sensitivity to hinge memory is greatly reduced, leading to improved reliability and higher device manufacturing yield. Because the mirrors are held at a low voltage, typically ground, there is no cross-talk between the mirrors.

The micromirror device described above is typically used to create projected images. Intermediate brightness levels are created by pulse width modulation techniques in which the mirror is rapidly and repetitively rotated on and off. The duty cycle of the mirror determines the quantity of light reaching the image plane. The human eye integrates the light pulses and the brain perceives a flicker-free intermediate brightness level.

Full-color images are generated by using three micromirror devices to produce three single-color images, or by sequentially forming three single-color images using a single micromirror device illuminated by a beam of light passing through three color filters mounted on a rotating color wheel.

FIG. 7 is a schematic view of an image projection system 700 using an improved micromirror 702 according to the present invention. In FIG. 7, light from light source 704 is focused on the improved micromirror 702 by lens 706. Although shown as a single lens, lens 706 is typically a group of lenses and mirrors which together focus and direct light from the light source 704 onto the surface of the micromirror device 702. The light source is positioned at an angle approximately equal to twice the angle of rotation so that mirrors rotated toward the light source reflect light in a direction normal to the surface of the micromirror device and into the aperture of a projection lens 710 (also shown as a single lens for simplicity). Mirrors rotated away from the light source reflect light away from the projection lens and to light trap 708. Image data and control signals from controller 714 determine the position of the mirrors. Projection lens 710 focuses the light modulated by the micromirror device 702 onto an image plane or screen 712. Pixels corresponding to the mirrors rotated toward the light source receive light, while the pixels corresponding to the mirrors rotated away from the light source remain dark.

Thus, although there has been disclosed to this point a particular embodiment for a capacitively coupled micromirror device and method therefore, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims. In the following claims, only elements denoted by the words "means for" are intended to be interpreted as means plus function claims under 35 U.S.C. §112, paragraph six.

What is claimed is:

1. A micromechanical device comprising:
    at least one member operable to deflect to either of at least two states;
    a switch associated with each said at least one member for selectively connecting said member to a ground signal; and
    at least one bias electrode associated with each said at least one member operable to apply a reset pulse when said member is connected to said ground signal by said switch.

2. The micromechanical device of claim 1, further comprising:
    a memory cell for storing positioning information, said memory cell having an output driving said switch.

3. The micromechanical device of claim 1, further comprising:
    a memory cell for storing positioning information, said memory cell comprising a capacitor storing a charge representing said positioning information.

4. The micromechanical device of claim 1, further comprising:
    a memory cell for storing positioning information, said memory cell comprising a capacitor storing a charge representing said positioning information and a pass transistor.

5. The micromechanical device of claim 1, said bias electrode comprising:
    at least two said bias electrodes, one associated with each said state.

6. The micromechanical device of claim 1, said member operable to deflect about an axis, said bias electrode comprising:
    at least two said bias electrodes, one on either side of said axis, said at least two bias electrodes electrically connected.

7. The micromechanical device of claim 1, said switch comprising: a pass transistor.

8. The micromechanical device of claim 1, wherein said member is a micromirror.

9. The micromechanical device of claim 1, further comprising:
    a memory cell for storing positioning information, said memory cell comprising a capacitor storing a charge representing said positioning information and a pass transistor, wherein said switch comprises:
    a pass transistor having a gate and two terminals, said gate connected to said memory capacitor, one said terminal connected to said member and a second said terminal connected to said ground connection.

10. The micromechanical device of claim 9, said memory cell operable to turn on said pass transistor when said memory cell capacitor holds a first charge.

11. The micromechanical device of claim 9, said memory cell operable to turn off said pass transistor when said memory cell capacitor holds a second charge.

12. A micromechanical device comprising:
    an array of independently deflectable members, each deflectable member supported by a hinge and spaced apart from a substrate;
    at least two bias electrodes supported by said substrate, one on each side of an axis of said hinge; and
    a means associated with at least one deflectable member of said array for selectively connecting said deflectable member to a ground potential during a period in which said bias electrodes provide a reset signal.

13. The micromechanical device of claim 12, said means for selectively connecting comprising a pass transistor.

14. The micromechanical device of claim 12, said means for selectively connecting comprising:
    a pass transistor; and
    a capacitor connected to a gate terminal of said pass transistor.

15. The micromechanical device of claim 12, said means for selectively connecting comprising:
    a pass transistor; and
    a capacitor, a first terminal of said capacitor connected to a gate terminal of said pass transistor and a second terminal of said capacitor connected to said ground potential.

16. A method of operating a micromechanical device, the method comprising:
    grounding a deflectable member;
    applying a reset signal to bias electrodes to reposition said selectively grounded deflectable member;
    electrically floating said deflectable member such that said reset signal does not reposition said electrically floating deflectable member.

17. The method of claim 16, further comprising:
    applying a bias potential to said bias electrodes to hold said repositioned deflectable member in place.

18. The method of claim 16, said deflectable member operable to deflect in one of two directions from a neutral position.

19. The method of claim 16, said selectively grounding a deflectable member comprising:
    grounding said deflectable member to cause said deflectable member to be repositioned during by said reset signal, and floating said deflectable member to prevent said deflectable member from being repositioned by said reset signal.

20. The method of claim 16, further comprising:
    applying an initialization signal to said bias electrodes to force said deflectable member to a known state.

21. The method of claim 20, said applying an initialization signal to said bias electrodes to force said deflectable member to a known state comprising:
    applying a voltage signal to one of said bias electrodes and a ground signal to another one of said bias electrodes.

22. A method of operating an array of micromechanical elements, the method comprising:
    grounding a deflectable member of a first group of said micromechanical elements;
    allowing a deflectable member of a second group of said micromechanical elements to electrically float; and
    applying a reset signal to bias electrodes associated with said micromechanical elements in said first and said second groups.

23. The method of claim 22, said reset signal operable to reposition said deflectable members of said first group.

24. The method of claim 22, said reset signal operable to reposition said deflectable members of said first group and not said deflectable members of said second group.

25. The method of claim 22, further comprising:
    applying a bias potential to said bias electrodes to hold said repositioned deflectable members of said first group and said deflectable members of said second group in place.

26. The method of claim 22, said deflectable members operable to deflect in one of two directions from a neutral position.

27. The method of claim 22, further comprising:
    applying an initialization signal to said bias electrodes to force said deflectable members of said first and second groups to a known state.

28. The method of claim 27, said applying an initialization signal to said bias electrodes to force said deflectable members of said first and second groups to a known state comprising:
    applying a voltage signal to one of said bias electrodes and a ground signal to another one of said bias electrodes.

* * * * *